(12) United States Patent
Pelc et al.

(10) Patent No.: US 12,372,719 B2
(45) Date of Patent: Jul. 29, 2025

(54) COMPACT OPTICAL COUPLER

(71) Applicant: Apple Inc., Cupertino, CA (US)

(72) Inventors: Jason Pelc, Sunnyvale, CA (US); Jin-Hyoung Lee, Yorba Linda, CA (US); Andrea Trita, Pasadena, CA (US)

( * ) Notice: Subject to any disclaimer, the term of this patent is extended or adjusted under 35 U.S.C. 154(b) by 396 days.

(21) Appl. No.: 17/903,875

(22) Filed: Sep. 6, 2022

(65) Prior Publication Data

US 2024/0077686 A1 Mar. 7, 2024

(51) Int. Cl.
- G02B 6/125 (2006.01)
- G02B 6/12 (2006.01)
- G02B 6/42 (2006.01)

(52) U.S. Cl.
CPC .............. *G02B 6/125* (2013.01); *G02B 6/42* (2013.01); *G02B 6/4203* (2013.01); *G02B 2006/12097* (2013.01)

(58) Field of Classification Search
CPC ........ G02B 6/4203; G02B 6/42; G02B 6/125; G02B 6/1228
See application file for complete search history.

(56) References Cited

U.S. PATENT DOCUMENTS

| | | | |
|---|---|---|---|
| 3,920,314 A | 11/1975 | Hiroyoshi | |
| 4,934,775 A | 6/1990 | Koai | |
| 5,044,715 A | 9/1991 | Kawachi | |
| 5,379,354 A | 1/1995 | Jenkins | |
| 5,524,156 A | 6/1996 | Van Der Tol | |
| 5,544,268 A | 8/1996 | Bischel | |
| 5,586,206 A | 12/1996 | Brinkman | |
| 5,647,036 A | 7/1997 | Deacon | |
| 5,652,817 A | 7/1997 | Brinkman | |
| 5,664,032 A | 9/1997 | Bischel | |
| 5,718,989 A | 2/1998 | Aoki | |
| 5,724,463 A | 3/1998 | Deacon | |
| 5,790,720 A | 8/1998 | Marcuse | |
| 5,799,119 A * | 8/1998 | Rolland | G02B 6/125 385/132 |

(Continued)

FOREIGN PATENT DOCUMENTS

| | | |
|---|---|---|
| CN | 201177670 Y | 1/2009 |
| CN | 109445026 | 12/2020 |

(Continued)

OTHER PUBLICATIONS

Yun et al. "2x2 adiabatic 3-dB coupler on silicon-on-insulator rib waveguides", Proc. SPIE 8915, 89150V (Oct. 11, 2013) (Year: 2013).*

(Continued)

*Primary Examiner* — Michelle R Connelly
*Assistant Examiner* — Eric Paul Struth
(74) *Attorney, Agent, or Firm* — Brownstein Hyatt Farber Schreck, LLP

(57) ABSTRACT

Configurations for an optical coupler that includes waveguides that provide asymmetric mode confinement. The optical coupler may include first and second rib waveguides, and the width of the shoulder of at least one rib waveguide may taper to provide the asymmetric mode confinement. In some instances the shoulders of one or both rib waveguides may have different heights in a central region of the optical coupler.

14 Claims, 10 Drawing Sheets

(56) References Cited

U.S. PATENT DOCUMENTS

| | | |
|---|---|---|
| 5,818,989 A | 10/1998 | Nakamura |
| 5,835,458 A | 11/1998 | Bischel |
| 5,911,018 A | 6/1999 | Bischel |
| 5,912,997 A | 6/1999 | Bischel |
| 5,923,801 A | 7/1999 | Werner et al. |
| 5,978,524 A | 11/1999 | Bischel |
| 6,014,390 A | 1/2000 | Joyner |
| 6,078,704 A | 6/2000 | Bischel |
| 6,118,908 A | 9/2000 | Bischel |
| 6,141,465 A | 10/2000 | Bischel |
| 6,167,169 A | 12/2000 | Brinkman |
| 6,393,185 B1 | 5/2002 | Deacon |
| 6,415,080 B1 | 7/2002 | Sappey et al. |
| 6,522,794 B1 | 2/2003 | Bischel |
| 6,643,432 B2 | 11/2003 | Bouda |
| 6,674,949 B2 | 1/2004 | Allan et al. |
| 6,842,545 B2 | 1/2005 | Lackritz et al. |
| 6,882,758 B2 | 4/2005 | Betty |
| 6,903,820 B2 | 6/2005 | Wang |
| 6,934,447 B2 | 8/2005 | Kim |
| 6,954,568 B2 | 10/2005 | Liu |
| 7,016,568 B2 | 3/2006 | Van Weerden et al. |
| 7,031,568 B2 | 4/2006 | Laming et al. |
| 7,103,247 B2 | 9/2006 | Yamazaki et al. |
| 7,149,387 B2 | 12/2006 | Balakrishnan et al. |
| 7,151,635 B2 | 12/2006 | Bidnyk et al. |
| 7,263,394 B2 | 8/2007 | Wang |
| 7,324,195 B2 | 1/2008 | Packirisamy et al. |
| 7,327,918 B2 | 2/2008 | Yamazaki et al. |
| 7,366,421 B2 | 4/2008 | Cho et al. |
| 7,421,167 B2 | 9/2008 | Charters et al. |
| 7,595,879 B2 | 9/2009 | Wang |
| 7,831,298 B1 | 11/2010 | Wang |
| 7,840,108 B2 | 11/2010 | Miyadera |
| 7,876,983 B2 | 1/2011 | Doerr |
| 7,970,458 B2 | 6/2011 | Norris et al. |
| 7,974,504 B2 | 7/2011 | Nagarajan et al. |
| 7,999,938 B2 | 8/2011 | Wang |
| 8,411,260 B1 | 4/2013 | Feng |
| 8,498,681 B2 | 7/2013 | Wang et al. |
| 9,052,447 B2 | 6/2015 | Luo et al. |
| 9,151,894 B2 | 10/2015 | Okano et al. |
| 9,176,282 B2 | 11/2015 | Pottier |
| 9,369,201 B2 | 6/2016 | Luo et al. |
| 9,395,494 B2 | 7/2016 | Krishnamurthi et al. |
| 9,557,482 B2 * | 1/2017 | Oka ............... G02B 6/2726 |
| 9,588,295 B2 | 3/2017 | Onawa |
| 9,678,012 B2 | 6/2017 | Rothberg et al. |
| 9,759,865 B1 | 9/2017 | Lin |
| 9,784,679 B2 | 10/2017 | Rothberg et al. |
| 9,817,296 B2 | 11/2017 | Sharkawy et al. |
| 9,869,816 B2 | 1/2018 | Ishikura et al. |
| 9,880,352 B2 | 1/2018 | Florjanczyk et al. |
| 9,977,187 B2 * | 5/2018 | Shi ................. G02B 6/125 |
| 10,126,498 B1 | 11/2018 | Marcuse |
| 10,215,689 B2 | 2/2019 | Wang et al. |
| 10,359,571 B2 | 7/2019 | Horth |
| 10,495,813 B2 | 12/2019 | Mahgerefteh et al. |
| 10,520,672 B2 | 12/2019 | Ma et al. |
| 10,551,567 B2 | 2/2020 | Wang et al. |
| 10,578,806 B2 | 3/2020 | Lamponi et al. |
| 10,901,148 B2 | 1/2021 | Ma et al. |
| 10,935,726 B1 | 3/2021 | Lee |
| 10,976,489 B2 | 4/2021 | Jou et al. |
| 10,983,200 B1 | 4/2021 | Shen et al. |
| 11,022,522 B2 | 6/2021 | Piazza et al. |
| 11,079,542 B2 | 8/2021 | Fertig et al. |
| 11,079,547 B2 | 8/2021 | Trita |
| 11,131,809 B2 | 9/2021 | Villafranca Velasco |
| 11,231,319 B1 | 1/2022 | Tu et al. |
| 11,280,960 B2 | 3/2022 | Qi et al. |
| 11,320,720 B2 | 5/2022 | Puckett et al. |
| 11,402,581 B2 * | 8/2022 | Baba ............... G02B 6/126 |
| 11,480,731 B2 | 10/2022 | Liu et al. |
| 11,500,154 B1 | 11/2022 | Tu et al. |
| 11,506,535 B1 | 11/2022 | Tu et al. |
| 11,561,346 B2 | 1/2023 | Tu et al. |
| 11,630,262 B2 | 4/2023 | Shin et al. |
| 11,644,619 B2 | 5/2023 | Qi et al. |
| 2003/0091265 A1 | 5/2003 | Lin et al. |
| 2003/0133663 A1 | 7/2003 | Orignac et al. |
| 2005/0031267 A1 | 2/2005 | Sumimoto |
| 2006/0002653 A1 | 1/2006 | Grunnet-Jepsen et al. |
| 2006/0039646 A1 | 2/2006 | Nashimoto |
| 2007/0217739 A1 | 9/2007 | McGreer et al. |
| 2008/0138008 A1 * | 6/2008 | Tolstikhin ............... G02B 6/125 385/14 |
| 2008/0266639 A1 | 10/2008 | Melloni et al. |
| 2012/0002924 A1 | 1/2012 | Okayama |
| 2013/0156361 A1 * | 6/2013 | Kojima ............... G02B 6/14 385/11 |
| 2014/0270620 A1 | 9/2014 | Anderson et al. |
| 2015/0104130 A1 | 4/2015 | Anderson et al. |
| 2015/0338577 A1 | 11/2015 | Shi et al. |
| 2019/0052063 A1 | 2/2019 | Tolstikhin |
| 2020/0333530 A1 * | 10/2020 | Lin ............... H01S 5/02326 |
| 2021/0191039 A1 | 6/2021 | Jou et al. |
| 2021/0270699 A1 | 9/2021 | Piazza et al. |
| 2022/0043207 A1 * | 2/2022 | Bian ............... G02B 6/136 |
| 2022/0091333 A1 | 3/2022 | Wu |
| 2022/0099889 A1 | 3/2022 | Arbore et al. |
| 2023/0071329 A1 | 3/2023 | Wu et al. |
| 2023/0094833 A1 | 3/2023 | Wu |
| 2023/0103057 A1 | 3/2023 | Wang et al. |
| 2023/0110382 A1 | 4/2023 | Wu et al. |
| 2023/0125733 A1 | 4/2023 | Thomas et al. |
| 2023/0358964 A1 | 11/2023 | Dezfouli et al. |
| 2024/0103224 A1 | 3/2024 | Arbore et al. |

FOREIGN PATENT DOCUMENTS

| | | |
|---|---|---|
| JP | H04204508 | 7/1992 |
| JP | H063709 | 1/1994 |
| JP | 2004246235 | 9/2004 |
| JP | 2005284256 | 10/2005 |
| JP | 2006284791 | 10/2006 |
| JP | 2007279240 | 10/2007 |
| JP | 2010223991 | 10/2010 |
| JP | 2011232674 | 11/2011 |
| JP | 2015152729 | 8/2015 |
| JP | 2015197664 | 11/2015 |
| JP | 2016148810 | 8/2016 |
| JP | 2018004692 | 1/2018 |
| KR | 10-2003-0049636 | 6/2003 |
| WO | WO 05/022223 | 11/2007 |

OTHER PUBLICATIONS

He et al., "Integrated Polarization Compensator for WDM Waveguide Demultiplexers," *IEEE Photonics Technology Letters* vol. 11, No. 2, Feb. 1999, pp. 224-226.

Dai et al., "10-Channel Mode (de)multiplexer with Dual Polarizations," *Laser & Photonics Reviews*, vol. 12, No. 1, Nov. 17, 2017, 9 pages.

Krubhakar et al., "Design and fabrication of integrated optical 1x8 power splitter in SOI substrate using large cross-section single-mode waveguides," Photonics 2010: Tenth International Conference on Fiber Optics and Photonics, Proceeding of SPIE, Bellingham, Washington, vol. 8173, No. 1, Dec. 29, 2010, pp. 1-6.

Liu et al., "Silicon Multimode Waveguide Grating Filter at 2 μm," *Journal of Lightwave Technology*, IEEE USA, vol. 37, No. 10, May 15, 2019, pp. 2217-2222.

Dai et al., "Compact silicon-on-insulator-based multimode interference coupler with bilevel taper structure," Applied Optics, Optical Society of America, vol. 44, No. 24, 2005, pp. 5036-5041.

Li et al., "Compact and low-loss silicon power splitter based on inverse tapers," Optics Letters, Optical Society of America, vol. 38, No. 20, 2013, pp. 4220-4223.

Rasigade et al., "Compact wavelength-insensitive fabrication-tolerant silicon-on-insulator beam splitter," Optics Letters, Optical Society of America, vol. 35, No. 21, 2010, pp. 3700-3702.

(56) References Cited

OTHER PUBLICATIONS

T. Murphy et al. "Wavelength and polarisation-intensive integrated directional couplers using Mach-Zehnder structures" (1999) Integrated Photonics Research, OSA Technical Digest Series (Optica Publishing Group).

Wang et al., "Ultra-broadband and low-loss 3 dB optical power splitter based on adiabatic silicon waveguides" (May 2016) Optics Letters 41(9) 2056-2057.

* cited by examiner

COMPACT OPTICAL COUPLER

FIELD

This disclosure relates generally to systems, devices, and methods for a compact optical coupler. More particularly, this disclosure relates to optical couplers with waveguides that provide asymmetric mode confinement.

BACKGROUND

Generally, optical couplers are used to couple light between waveguides that are positioned in close proximity to each other. Optical couplers, especially those that rely on mode evolution principles to couple light between tapering waveguides, can increase in size as the target operating bandwidth (i.e., the range of wavelengths across which the optical coupler is expected to perform) increases. For example, it may be desirable to maintain a single mode of light in each waveguide even as the width of the waveguide changes. As a result, these optical couplers may use adiabatic tapers to change the width of the waveguide without generating additional light modes. The level of adiabaticity at least partially determines how accurately that light introduced into an input of the optical coupler is split between the outputs. Because the level of adiabaticity is proportional to the optical power coupler's length, accurately splitting light between the outputs can require long coupler lengths (e.g., on the order of several millimeters for silicon-based adiabatic power couplers). Accordingly, it may be desirable to provide compact optical couplers.

SUMMARY

Embodiments of the systems, devices, methods, and apparatuses described in the present disclosure are directed to an optical power coupler. Also described are systems, devices, methods, and apparatuses directed to asymmetric mode confinement in the waveguides of an optical power coupler and to asymmetric shoulder confinement of light in the waveguides of an evanescent optical coupler. The asymmetric confinement may promote the coupling of light between waveguides and may reduce the overall size of the respective optical coupler (as compared to optical couplers that do not have asymmetrical confinement).

In some embodiments, an optical coupler includes a slab waveguide defining a first shoulder region, a second shoulder region, and a third shoulder region, a first rib waveguide including a first strip positioned on the slab waveguide, and a second rib waveguide including a second strip positioned on the slab waveguide, wherein the first rib waveguide is optically coupled to the second rib waveguide in a central region. The first shoulder region is adjacent to a first side of the first strip and the third shoulder region is adjacent to a first side of the second strip, while the second shoulder region is adjacent to a second side of the first strip and a second side of the second strip. A width of the first shoulder region tapers to provide asymmetrical mode confinement of light that passes through the first rib waveguide.

In some of these embodiments, the slab waveguide comprises a lower slab region having a first height and an upper slab region having a second height higher than the first height. The upper slab region defines the first shoulder region, the second shoulder region, and the third shoulder region. In some of these instances, the width of the first shoulder region tapers to zero in a first portion of the first rib waveguide. In these variations, the first shoulder region defines a first shoulder of the first rib waveguide in the first portion of the first rib waveguide and the lower slab region defines the first shoulder of the first rib waveguide in a second portion of the first rib waveguide. The optical coupler may further include a fourth shoulder region defined by the upper slab. The fourth shoulder region defines the first shoulder of the first rib waveguide in a third portion of the first rib waveguide, and a width of the fourth shoulder region tapers in the third portion of the first rib waveguide.

In other variations, the width of the first shoulder region tapers to a minimum width, the first shoulder region defines a first shoulder of the first rib waveguide in the central region, and the first shoulder region has the minimum width across the central region. Additionally or alternatively, a width of the third shoulder region tapers to provide asymmetrical mode confinement of light that passes through the second rib waveguide. Additionally or alternatively, a width of the first strip tapers in the central region. In other instances, a width of the first strip and a width of the second strip is constant in the central region.

In other embodiments, an optical coupler includes a first rib waveguide having a first strip, a first shoulder, and a second shoulder, and a second rib waveguide having a second strip, a first shoulder, and a second shoulder. The first rib waveguide is optically coupled to the second rib waveguide in a central region, the first shoulder of the first rib waveguide has a first height in the central region, and the second shoulder of the first rib waveguide has a second height higher than the first height in the central region. In some instances, the first shoulder of the second rib waveguide has the first height in the central region and the second shoulder of the second rib waveguide has the second height in the central region.

Additionally or alternatively, the first strip and the second strip are disposed on a slab waveguide, the slab waveguide defines the second shoulder of the first rib waveguide in the central region, and the slab waveguide defines the second shoulder of the second rib waveguide in the central region. In some of these instances, the slab waveguide is positioned on a cladding layer, the cladding layer defines the first shoulder of the first rib waveguide in the central region such that the first height is zero. The slab waveguide may define the first shoulder of the first rib waveguide in an input region and define the second shoulder of the first rib waveguide in the input region. In these instances, the first shoulder and the second shoulder each have the second height in the input region. In other variations, the slab waveguide has a lower slab region and an upper slab region, such that the lower slab region defines the first shoulder of the first rib waveguide in the central region and the upper slab region defines the second shoulder of the first rib waveguide in the central region.

In still other embodiments, an optical system includes one or more light sources configured to generate light and an optical coupler. The optical coupler includes a first rib waveguide optically coupled to the one or more light sources to receive a first portion of light therefrom and a second rib waveguide optically coupled to the one or more light sources to receive a second portion of light therefrom. The first rib waveguide has a first strip and a first shoulder adjacent to a first side of the first strip, and a width of the first shoulder of the first rib waveguide tapers in a first portion of the first rib waveguide to apply asymmetric mode confinement to the first portion of light. Similarly, the second rib waveguide has a second strip and a first shoulder adjacent to a first side of the second strip, and a width of the first shoulder of the second rib waveguide tapers in a first portion of the second rib waveguide to apply asymmetric mode confinement to the second portion of light. In some instances the optical system includes a photonic integrated circuit that incorporates the one or more light sources and the optical coupler.

The first rib waveguide is optically coupled to the second rib waveguide of the optical coupler. In some of these instances, the first shoulder of the first rib waveguide has a first height in the first portion of the first rib waveguide and a second height in the central region, such that the second height is higher than the first height. In other instances, the first shoulder of the first rib waveguide has a first height in the first portion of the first rib waveguide and the first height in the central region. In some of these variations, the first shoulder of the first rib waveguide tapers to a minimum width in the first portion of the first rib waveguide, and the first shoulder has the minimum width in the central region.

In addition to the example aspects and embodiments described above, further aspects and embodiments will become apparent by reference to the drawings and by study of the following description.

Figure 1A:
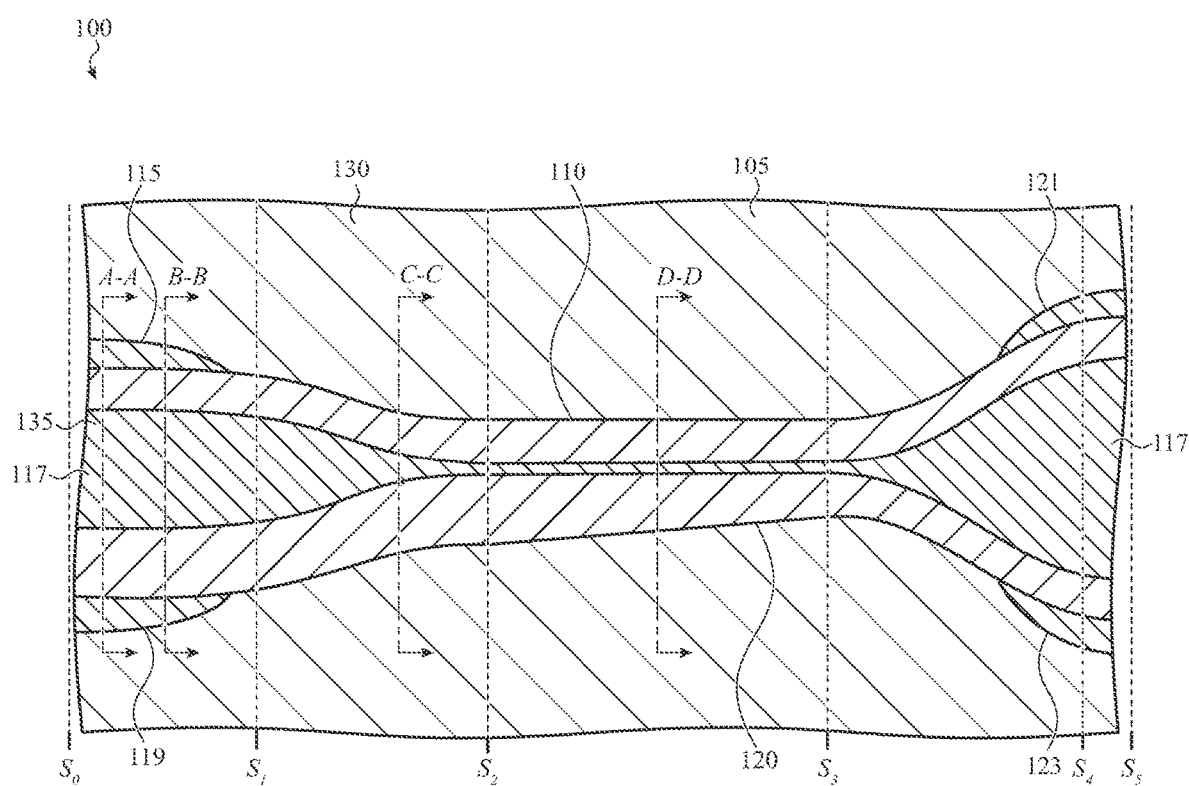
FIG. 1A illustrates an example optical coupler as described herein.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Disclosed herein are optical couplers, as well as associated integrated photonic circuits and optical circuits, with waveguides that provide asymmetric mode confinement of light. The optical couplers include two waveguides and may act as a one-by-two or a two-by-two coupler when incorporated into an optical system. Light introduced to the optical coupler through one of the waveguides (i.e., at an input of the optical coupler) will be split between the two waveguides (i.e., at the outputs of the optical coupler). Each waveguide may be configured to asymmetrically confine light toward the other waveguide, which may facilitate coupling of light between the waveguides over a shorter distance as compared to traditional optical couplers.

The optical coupler, which may be configured as a mode evolution coupler or an evanescent coupler, includes waveguides that are formed as rib waveguides. Each rib waveguide includes a strip waveguide positioned on a slab of waveguide material that defines a shoulder on each side of the strip waveguide. In some instances, the width of a shoulder of each waveguide may narrow in the optical coupler to asymmetrically confine the mode of light traveling through the waveguide. Further, in some instances the optical coupler has shoulders with different heights (i.e., relative to a cladding layer or substrate upon which the waveguide is formed), which may also asymmetrically confine the mode of light traveling through the optical coupler. Asymmetric mode confinement in one waveguide may preferentially couple toward the other waveguide and thus may achieve a target amount of coupling between the waveguides over a shorter distance as compared to conventional optical couplers. Furthermore, the optical couplers may split light over a broad operating bandwidth (e.g., spanning at least 300 nm, at least 500 nm, or at least 1000 nm).

These and other embodiments are discussed below with reference to FIGS. 1A-5. However, those skilled in the art will readily appreciate that the detailed description given herein with respect to these figures is for explanatory purposes only and should not be construed as limiting.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

FIGS. 1A-1E illustrate an example optical coupler 100 as described herein. Specifically, FIG. 1A shows a top view of the optical coupler 100, which includes a slab waveguide 105 (hereinafter referred to as "slab 105"), a first strip 110 positioned on the slab 105, and a second strip 120 positioned on the slab 105. The first strip 110 and slab 105 form a first rib waveguide and the second strip 120 and slab 105 form a second rib waveguide. The slab defines an inner and outer shoulder for each rib waveguide, which are used to provide asymmetric mode confinement as discussed below.

The optical coupler 100 of FIG. 1A includes five regions: an input region, a first transition region, a central region, a second transition region, and an output region. The input region (depicted in FIG. 1A between lines S0 and S1), represents a region where the optical coupler 100 receives light, and the first and second rib waveguides are not optically coupled (i.e., the first strip 110 and the second strip 120 are positioned far enough apart such that light received by one waveguide does not couple to the other). When the optical coupler 100 is incorporated into a photonic integrated circuit as discussed below, the optical coupler 100 may receive light at either or both of the first strip 110 and the second strip 120 in the input region from one or more light sources. In this way, the first strip 110 and/or second strip 120 may act as inputs to the optical coupler 100.

The first transition region (depicted in FIG. 1A between lines S1 and S2) represents a region in which the distance between first strip 110 and the second strip 120 decreases in order to allow for optical coupling between the first rib waveguide and the second rib waveguide in the central region. Typically, at least one of the first strip 110 and the second strip 120 includes one or more curves (e.g., a S-shaped curve) in the first transition region that facilitate bringing the first strip 110 and second strip 120 closer together. It should be appreciated that some optical coupling may occur between the first and second rib waveguides in the transition region as the first and second strips 110, 120 get closer to each other. In the central region (depicted in FIG. 1A between lines S2 and S3), the first strip 110 and second strip 120 are positioned close enough together such that light couples between the first and second rib waveguide. In some instances the distance between the first strip 110 and the second strip 120 is constant across the central region.

The optical coupler 100 is depicted in FIG. 1A as a mode evolution coupler (also known as an adiabatic coupler), and thus at least one of the first strip 110 and second strip 120 has a width that tapers across the central region to facilitate optical coupling between the first strip 110 and the second strip 120. For example, as the width of the second strip 120 tapers in the second region as shown in FIG. 1A, the field profile of light traveling through the second strip 120 may change. If the second strip 120 has an adiabatic taper, the light will remain in the same mode as this field profile changes, and some of the optical power will couple into the first strip 110. Accordingly, the size and shape of the first and second strips 110, 120, as well as the spacing between them, can control the amount of coupling that occurs between the first and second rib waveguides within the central region.

The second transition region (depicted in FIG. 1A between lines S3 and S4) represents a region in which the distance between the first strip 110 and the second strip 120 increases in order to optically decouple the first rib waveguide and the second rib waveguide. Typically, at least one of the first strip 110 and the second strip 120 includes one or more curves (e.g., a S-shaped curve) in the second transition region that facilitate moving the first strip 110 and second strip 120 further apart. It should be appreciated that some optical coupling may occur between the first and second rib waveguides in the transition region as the first and second strips 110, 120 initially move away from each other after the central region terminates. The output region (shown in FIG. 1A between lines S4 and S5) represents a region where the optical coupler 100 outputs light, and the first and second rib waveguides are not optically coupled (i.e., the first strip 110 and the second strip 120 are positioned far enough apart such that light received by one waveguide does not couple to the other). When the optical coupler 100 receives light at one or more inputs (i.e., at the first strip 110 and/or the second strip 120 in the input region), the optical coupler 100 will output light from the first strip 110 and the second strip 120 in the output region. The splitting ratio (i.e., how much of the light received at one input gets split between the two outputs) may depend on the dimensions and spacing of the first and second rib waveguides.

The rib waveguides of the optical coupler 100 may have different shoulder heights in different regions of the optical coupler 100. As used herein, the term "shoulder" refers to the upper surface of a slab waveguide immediately adjacent to a side of a strip waveguide. For the purpose of the application, if the slab waveguide does not extend laterally past a side of a strip waveguide, that is considered to be a shoulder having zero height (such as described with respect to FIGS. 4A-4E). Accordingly, each rib waveguide as described herein includes a strip waveguide and two shoulders, one on each side of the strip waveguide.

In the variation of optical coupler 100 shown in FIGS. 1A-1E, the slab 105 is positioned on a cladding layer 140 which includes a lower slab region 130 having a first height and an upper slab region 135 having a second height taller than the first. In some regions, the upper slab region 135 defines the shoulders for the first and second rib waveguides, while in other regions the lower slab region 130 defines a shoulder of at least one rib waveguide. For example, the optical coupler may include a first shoulder region 115, a second shoulder region 117, and a third shoulder region 119, each of which is formed from the upper slab region 135 and accordingly has the second height. The first shoulder region 115 is adjacent a first side of the first strip 110 and defines a first shoulder for at least a portion of the first rib waveguide. Similarly, the third shoulder region 119 is adjacent a first side of the second strip 120 and defines a first shoulder for at least a portion of the second rib waveguide. The second shoulder region 117 is positioned between the first and second strips 110, 120 and adjacent to both a second side of the first strip 110 and a second side of the second strip 120. Accordingly, the second shoulder region 117 defines both a second shoulder for at least a portion of the first rib waveguide and a second shoulder for at least a portion of the second rib waveguide.

Figure 1B:
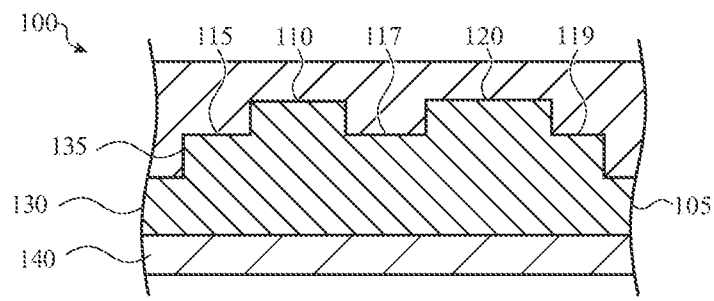
FIG. 1B illustrates an example diagram of the cross-section A-A of FIG. 1A.

The first shoulder region 115 is positioned in at least the input region of the optical coupler 100, and a width of the first shoulder region 115 tapers to asymmetrically confine the mode of light traveling in the first rib waveguide. FIG. 1B shows a side view of the cross-section A-A of FIG. 1A, in which the first shoulder region 115 has a first width (i.e., defined by the transition from the upper slab region 135 to the lower slab region 130). The first width may be sized such that the first shoulder region 115 does not actively constrain the mode of light in the first rib waveguide. In other words, the first width is sufficiently large such that variations in the first width do not change the spatial profile of the light traveling through the first rib waveguide.

Figure 1C:
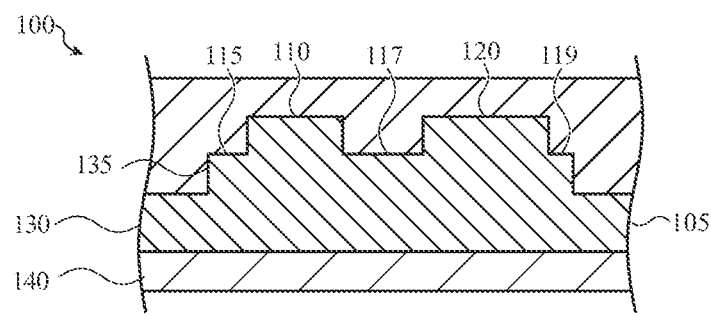
FIG. 1C illustrates an example diagram of the cross-section B-B of FIG. 1A.

Conversely, FIG. 1C shows a side view of the cross-section B-B of FIG. 1A, in which the first shoulder region 115 has a second width narrower than the first width. At this point, the second width of the first shoulder region 115 is sufficiently small such that it alters the spatial profile of the mode of light in the first rib waveguide. The second shoulder region 117 (which in the variation shown in FIG. 1A is positioned in each of the regions of the optical coupler), and thus the second shoulder of the first rib waveguide, has a width sized so that it does not actively constrain the mode of light in the first rib waveguide, thereby resulting in asymmetric confinement of the mode of light in the first rib waveguide.

Figure 1D:
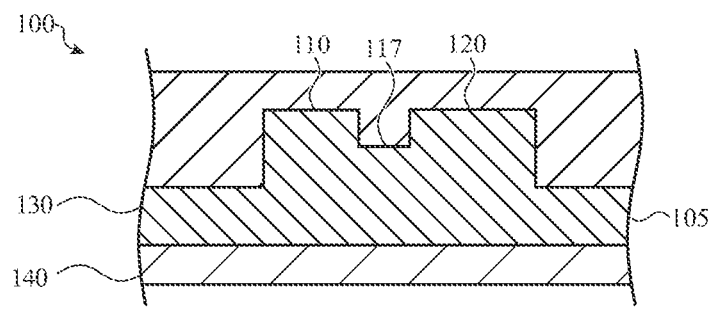
FIG. 1D illustrates an example diagram of the cross-section C-C of FIG. 1A.
Figure 1E:
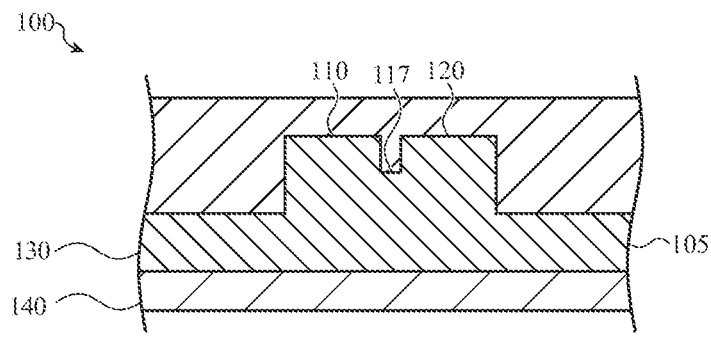
FIG. 1E illustrates an example diagram of the cross-section D-D of FIG. 1A.

The width of the first shoulder region 115 may taper to a minimum width. In the variation shown in FIGS. 1A-1E, this minimum width is zero, such that the first shoulder region 115 terminates. After the first shoulder region 115 terminates, the lower slab region 130 is now adjacent to the first side of the first strip 110, and thereby defines the first shoulder of the first rib waveguide in a different region of the first rib waveguide. This is illustrated in FIGS. 1D and 1E, which shows side views of the cross-sections C-C in the first transition region and D-D in the central region, respectively, of FIG. 1A. In these regions, the first rib waveguide has two shoulders with different shoulder heights. Specifically, the first shoulder of the first rib waveguide is defined by the lower slab region 130, and thereby has the first height, while the second shoulder of the first rib waveguide is defined by the upper slab region 135 (i.e., the second shoulder region 117), and thereby has the second height. This difference in shoulder height provides asymmetric mode confinement of light in the first rib waveguide, which may promote optical coupling to the second rib waveguide in the central region.

While the first shoulder region 115 is shown in FIG. 1A as tapering to its minimum width in the input region, it should be appreciated that the tapering may occur in any suitable portion of the optical coupler 100. In some instances, the first shoulder region 115 may begin tapering its width in the input region such that it begins asymmetrically confining light in the first rib waveguide in the input region, but does not reach its minimum width until the first transition region. In other variations, the first shoulder region 115 begins tapering in the first transition region (and thus does not asymmetrically confine light in the input region). In some of these variations, the first shoulder region 115 reaches its minimum width in the first transition region. In other variations, the first shoulder region 115 reaches its minimum width in the central region.

Similarly, the third shoulder region 119 is positioned in at least the input region of the optical coupler 100, and a width of the third shoulder region 119 tapers to asymmetrically confine the mode of light traveling in the second rib waveguide. For example, in the cross-section shown in FIG. 1B in which the third shoulder region 119 has a first width (i.e., defined by the transition from the upper slab region 135 to the lower slab region 130). As with the first width of the first shoulder region 115 (which may be the same or a different width), the first width of the third shoulder region 119 may be sized such that the third shoulder region 119 does not actively constrain the mode of light in the second rib waveguide, such that variations in the first width do not change the spatial profile of the light traveling through the second rib waveguide.

Conversely, in the cross-section shown in FIG. 1C, the third shoulder region 119 has a second width narrower than the first width. As with the second width of the first shoulder region 115, the second width of the third shoulder region 119 is sufficiently small such that it alters the spatial profile of the mode of light in the second rib waveguide. The second shoulder region 117, and thus the second shoulder of the second rib waveguide, has a width sized so that it does not actively constrain the mode of light in the second rib waveguide, thereby resulting in asymmetric confinement of the mode of light in the second rib waveguide.

The width of the third shoulder region 119 may taper to a minimum width. In the variation shown in FIGS. 1A-1E, this minimum width is zero, such that the third shoulder region 119 terminates. After the third shoulder region 119 terminates, the lower slab region 130 is now adjacent to the first side of the second strip 120, and thereby defines the first shoulder of the second rib waveguide in a different region of the second rib waveguide. This is illustrated in the cross-sections shown in FIGS. 1D and 1E. In these regions, the second rib waveguide has two shoulders with different shoulder heights. Specifically, the first shoulder of the second rib waveguide is defined by the lower slab region 130, and thereby has the first height, while the second shoulder of the first rib waveguide is defined by the upper slab region 135 (i.e., the second shoulder region 117), and thereby has the second height. This difference in shoulder height provides asymmetric mode confinement of light in the second rib waveguide, which may promote optical coupling to the first rib waveguide in the central region.

While the third shoulder region 119 is shown in FIG. 1A as tapering to its minimum width in the input region, it should be appreciated that the tapering may occur in any suitable portion of the optical coupler 100. In some instances, the third shoulder region 119 may begin tapering its width in the input region such that it begins asymmetrically confining light in the second rib waveguide in the input region, but does not reach its minimum width until the first transition region. In other variations, the third shoulder region 119 begins tapering in the first transition region (and thus does not asymmetrically confine light in the input region). In some of these variations, the third shoulder region 119 reaches its minimum width in the first transition region. In other variations, the third shoulder region 119 reaches its minimum width in the central region. It should be appreciated that the tapering of the first shoulder region 115 may occur in the same region or regions of the optical coupler 100 as the tapering of the third shoulder region 119, but need not.

In some instances, the optical coupler 100 further includes a fourth shoulder region 121. The fourth shoulder region 121, like the first shoulder region 115, is formed from the upper slab region 135 and is positioned adjacent the first side of the first strip 110. The fourth shoulder region 121 is positioned in at least an output region of the optical coupler 100, and defines the first shoulder for a different portion of the first rib waveguide. While the width of first shoulder region 115 decreases along a direction from the input region toward the output region, the width of the fourth shoulder region 121 increases along this direction. Specifically, the fourth shoulder region 121 increases from a minimum width (e.g., zero in the embodiment of FIGS. 1A-1E) to a width at which the fourth shoulder region 121 no longer actively constrains the mode of light. In this way, the fourth shoulder region 121 gradually eliminates the asymmetric mode confinement of light in the first rib waveguide. While the fourth shoulder region 121 is shown in FIG. 1A as tapering in the second transition region, it should be appreciated that the fourth shoulder region 121 may taper its width in any of the central region, the second transition region, the output region, or combinations thereof.

In these variations, the first rib waveguide has a first portion in which the first shoulder region 115 and the second shoulder region 117 respectively define the first and second shoulders of the first rib waveguide (which have the same height in this portion). The first rib waveguide has a second portion in which the lower slab region 130 and the second shoulder region 117 define the first and second shoulders of the first rib waveguide (which have different heights in this portion). The first rib waveguide has a third portion in which the fourth shoulder region 121 and the second shoulder region 117 respectively define the first and second shoulders of the first rib waveguide (which have the same height in this portion).

Similarly, the optical coupler 100 may further include a fifth shoulder region 123. The fifth shoulder region 123, like the third shoulder region 119, is formed from the upper slab region 135 and is positioned adjacent the first side of the second strip 120. The fifth shoulder region 123 is positioned in at least an output region of the optical coupler 100, and defines the first shoulder for a different portion of the second rib waveguide. While the width of the third shoulder region 119 decreases along a direction from the input region toward the output region, the width of the fifth shoulder region 123 increases along this direction. Specifically, the fifth shoulder region 123 increases from a minimum width (e.g., zero in the embodiment of FIGS. 1A-1E) to a width at which the fifth shoulder region 123 no longer actively constrains the mode of light. In this way, the fifth shoulder region 123 gradually eliminates the asymmetric mode confinement of light in the first rib waveguide. While the fifth shoulder region 123 is shown in FIG. 1A as tapering in the second transition region, it should be appreciated that the fifth shoulder region 123 may taper its width in any of the central region, the second transition region, the output region, or combinations thereof.

In these variations, the second rib waveguide has a first portion in which the third shoulder region 119 and the second shoulder region 117 respectively define the first and second shoulders of the second rib waveguide (which have the same height in this portion). The second rib waveguide has a second portion in which the lower slab region 130 and the second shoulder region 117 define the first and second shoulders of the second rib waveguide (which have different heights in this portion). The second rib waveguide has a third portion in which the fifth shoulder region 123 and the second shoulder region 117 respectively define the first and second shoulders of the second rib waveguide (which have the same height in this portion).

The asymmetric mode confinement provided by the narrowed shoulder width in some portions of the first and second rib waveguides and the different shoulder heights in other portions of the first and second rib waveguides may allow the optical coupler 100 to obtain a target amount of light splitting in a smaller form factor as compared to traditional optical couplers. While the first and second rib waveguides of the optical coupler 100 each have a portion with different shoulder heights, in other variations, an optical coupler as described herein has at least one rib waveguide that has the same shoulder height across the entire optical coupler.

For example, FIGS. 2A-2E show a variation of an optical coupler 200. As with the optical coupler 100 of FIGS. 1A-1E, the optical coupler 200 includes a slab waveguide 205 (hereinafter referred to as "slab 205"), a first strip 210 positioned on the slab 205, and a second strip 220 positioned on the slab 205. The first strip 210 and slab 205 form a first rib waveguide, with the slab 205 defining first and second shoulders of the first rib waveguide. Similarly, the second strip 220 and the slab 205 form a second rib waveguide, with the slab 205 defining first and second shoulders of the second rib waveguide.

The optical coupler 200 includes an input region (between lines S0 and S1), a first transition region (between lines S1 and S2), a central region (between lines S2 and S3), a second transition region (between lines S3 and S4), and an output region (between lines S4 and S5). These regions operate similarly to the same regions of optical coupler 100, such that the first and second rib waveguides are not optically coupled in the input and output regions, but are optically coupled in the central region. The optical coupler 200 is configured as a mode evolution coupler, and thus one or both of the first and second strips 210, 220 taper their widths in the central region. In some of these variations, the distance between the first and second strips 210, 220 is constant across the central region.

The slab 205 is positioned on a cladding layer 240, and is shown in FIGS. 2A-2E as having a lower slab region 230 having a first height and an upper slab region 235 having a second height taller than the first. The upper slab region 235 defines the first and second shoulders for each of the first and second waveguides across the optical coupler 200. In other variations, the slab 205 does not include a lower slab region 230 and may only have a single height that defines the shoulders of the first and second rib waveguides. The optical coupler may include a first shoulder region 215, a second shoulder region 217, and a third shoulder region 219, each of which is formed from the upper slab region 235 and accordingly has the second height. The first shoulder region 215 is adjacent a first side of the first strip 210 and defines a first shoulder for the first rib waveguide. Similarly, the third shoulder region 219 is adjacent a first side of the second strip 220 and defines a first shoulder for the second rib waveguide. The second shoulder region 217 is positioned between the first and second strips 210, 220 and adjacent to both a second side of the first strip 210 and a second side of the second strip 220. Accordingly, the second shoulder region 217 defines both a second shoulder of the first rib waveguide and a second shoulder of the second rib waveguide.

The first shoulder region 215 is positioned in each region of the optical coupler 200, and a width of the first shoulder region 215 tapers to asymmetrically confine the mode of light traveling in the first rib waveguide. FIG. 2B shows a side view of the cross-section A-A of FIG. 2A, in which the first shoulder region 215 has a first width defined by the transition from the upper slab region 235 to the lower slab region 230. The first width may be sized such that the first shoulder region 215 does not actively constrain the mode of light in the first rib waveguide, such that variations in the first width do not change the spatial profile of the light traveling through the first rib waveguide.

Figure 2A:
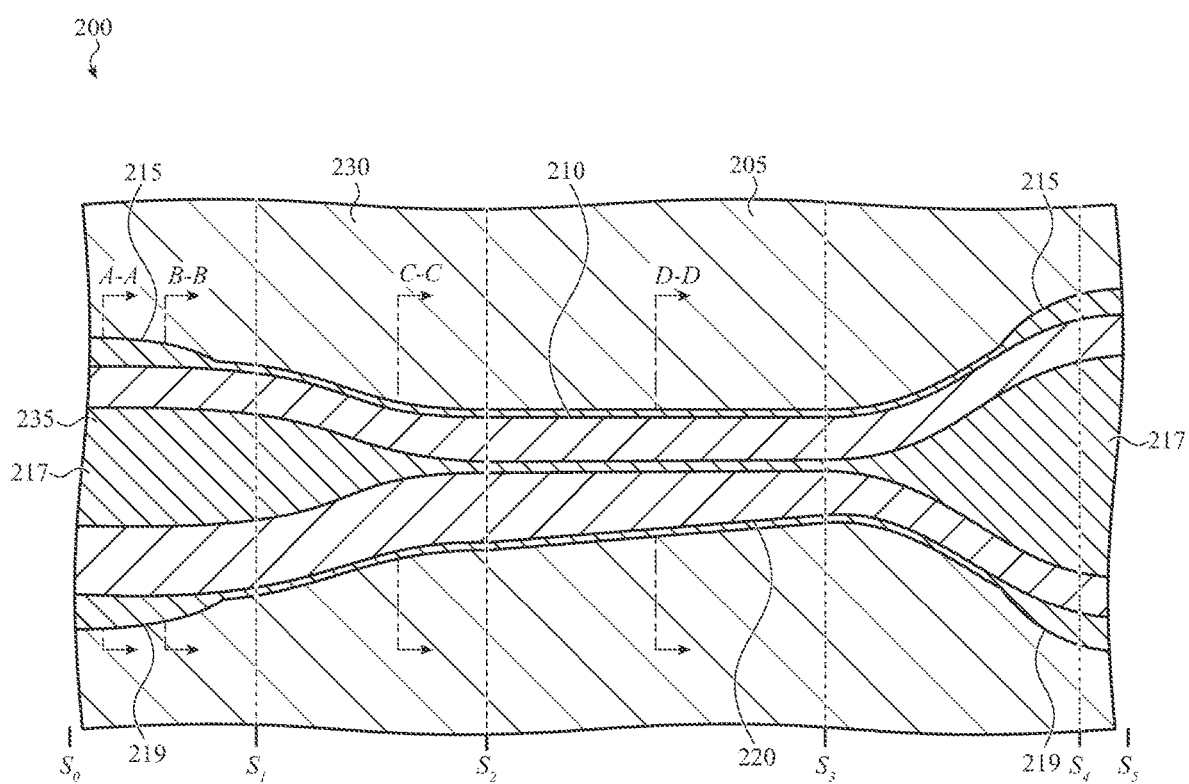
FIG. 2A illustrates an example diagram of another optical coupler as described herein.
Figure 2B:
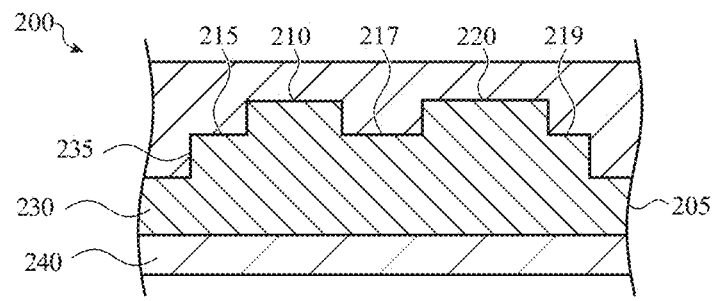
FIG. 2B illustrates an example diagram of the cross-section A-A of FIG. 2A.
Figure 2C:
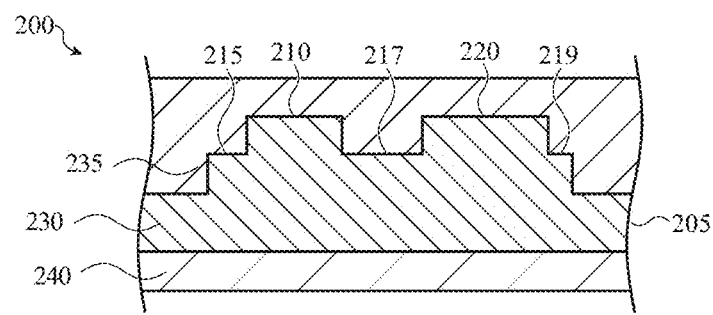
FIG. 2C illustrates an example diagram of the cross-section B-B of FIG. 2A.

FIG. 2C shows a side view of the cross-section B-B of FIG. 2A, in which the first shoulder region 215 has a second width narrower than the first width. At this point, the second width of the first shoulder region 215 is sufficiently small such that it alters the spatial profile of the mode of light in the first rib waveguide. The second shoulder region 217, and thus the second shoulder of the first rib waveguide, has a width sized so that it does not actively constrain the mode of light in the first rib waveguide, thereby resulting in asymmetric confinement of the mode of light in the first rib waveguide.

Figure 2D:
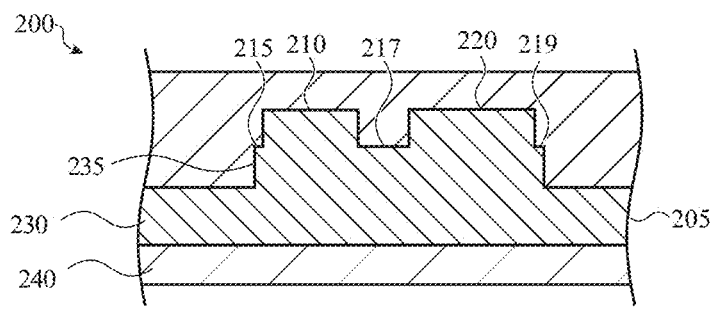
FIG. 2D illustrates an example diagram of the cross-section C-C of FIG. 2A.
Figure 2E:
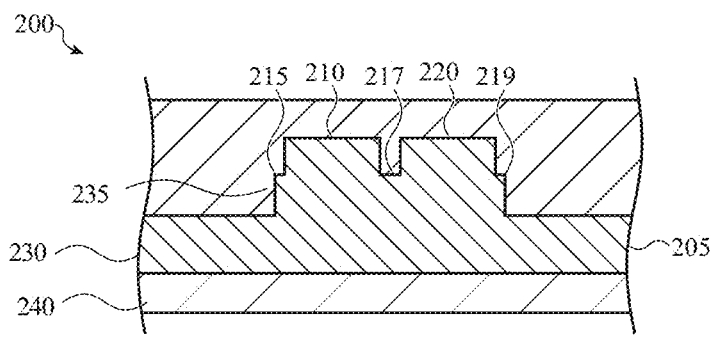
FIG. 2E illustrates an example diagram of the cross-section D-D of FIG. 2A.

The width of the first shoulder region 215 may taper to a minimum width. Unlike the optical coupler 100 of FIGS. 1A-1E, where the first shoulder region 115 tapers to zero, the first shoulder region 215 of the optical coupler tapers to a non-zero minimum width (and thus does not terminate). The first shoulder region 215 continues with this minimum width through a portion of the optical coupler 200, such as shown in FIGS. 2D and 2E, which shows side views of the cross-sections C-C in the first transition region and D-D in the central region, respectively, of FIG. 2A. Eventually the width of the first shoulder region 215 again increases to a width at which the first shoulder region 215 no longer asymmetrically confines the mode of light in the first rib waveguide.

As a result, the first rib waveguide includes a first portion in which the width of the first shoulder region 215 tapers to the minimum width to introduce asymmetric mode confinement, a second portion in which the width of the first shoulder region 215 is at the minimum width to continue the asymmetric mode confinement, and a third portion in which the width of the first shoulder region 215 increases to eliminate the asymmetric mode confinement. The first and third portions may occur in any region or regions of the optical coupler 200. For example, in the variation shown in FIG. 2A, the first portion is positioned in the input region and the second portion is positioned in the second transition region, such that the second portion extends from the input region to the second transition region.

Similarly, the third shoulder region 219 is positioned in each region of the optical coupler 200, and a width of the third shoulder region 219 tapers to asymmetrically confine the mode of light traveling in the second rib waveguide. For example, in the cross-section A-A shown FIG. 2B, the third shoulder region 219 has a first width defined by the transition from the upper slab region 235 to the lower slab region 230. The first width may be sized such that the first shoulder region 215 does not actively constrain the mode of light in the second rib waveguide, such that variations in the first width do not change the spatial profile of the light traveling through the second rib waveguide.

In the cross-section B-B shown in FIG. 2C, the third shoulder region 219 has a second width narrower than the first width. At this point, the second width of the third shoulder region 219 is sufficiently small such that it alters the spatial profile of the mode of light in the second rib waveguide. The second shoulder region 217, and thus the second shoulder of the second rib waveguide, has a width sized so that it does not actively constrain the mode of light in the second rib waveguide, thereby resulting in asymmetric confinement of the mode of light in the second rib waveguide.

The width of the third shoulder region 219 may taper to a minimum width. As with the first shoulder region 215, the third shoulder region 219 of optical coupler 200 tapers to a non-zero minimum width (and thus does not terminate), though it should be appreciated that in some variations the width of the third shoulder region 219 does taper and is configured in the same manner as the second strip waveguide of FIGS. 1A-1E. The third shoulder region 219 continues with this minimum width through a portion of the optical coupler 200, such as shown in FIGS. 2D and 2E. Eventually the width of third shoulder region 219 again increases to a width at which the third shoulder region 219 no longer asymmetrically confines the mode of light in the second rib waveguide.

As a result, the second rib waveguide includes a first portion in which the width of the third shoulder region 219 tapers to the minimum width to introduce asymmetric mode confinement, a second portion in which the width of the third shoulder region 219 is at the minimum width to continue the asymmetric mode confinement, and a third portion in which the width of the third shoulder region 219 increases to eliminate the asymmetric mode confinement. The first and third portions may occur in any region or regions of the optical coupler 200. For example, in the variation shown in FIG. 2A, the first portion is positioned in the input region and the second portion is positioned in the second transition region, such that the second portion extends from the input region to the second transition region.

While the optical couplers described with respect to FIGS. 1A-2E are configured as mode evolution couplers, in other variations the optical couplers described herein may be configured as evanescent couplers. For example, FIGS. 3A-3E show a variation of an optical coupler 300. The optical coupler 300 can be configured in any manner as described above with respect to the optical coupler 100 of FIGS. 1A-1E (with elements labeled as "3xx" in FIGS. 3A-3E corresponding to similar elements labeled as "1xx" in FIGS. 1A-1E), except for the relative widths of the first strip 310 and the second strip 320. In these variations, the widths of the first strip 310 and the second strip 320 remain constant across the central region (between lines S2 and S3). Additionally, a distance between the first strip 310 and the second strip 320 may remain constant across the central region. As light travels through one of the rib waveguides, the evanescent mode of light in that rib waveguide may overlap with the other waveguide and thereby couple light between the rib waveguides.

Figure 3A:
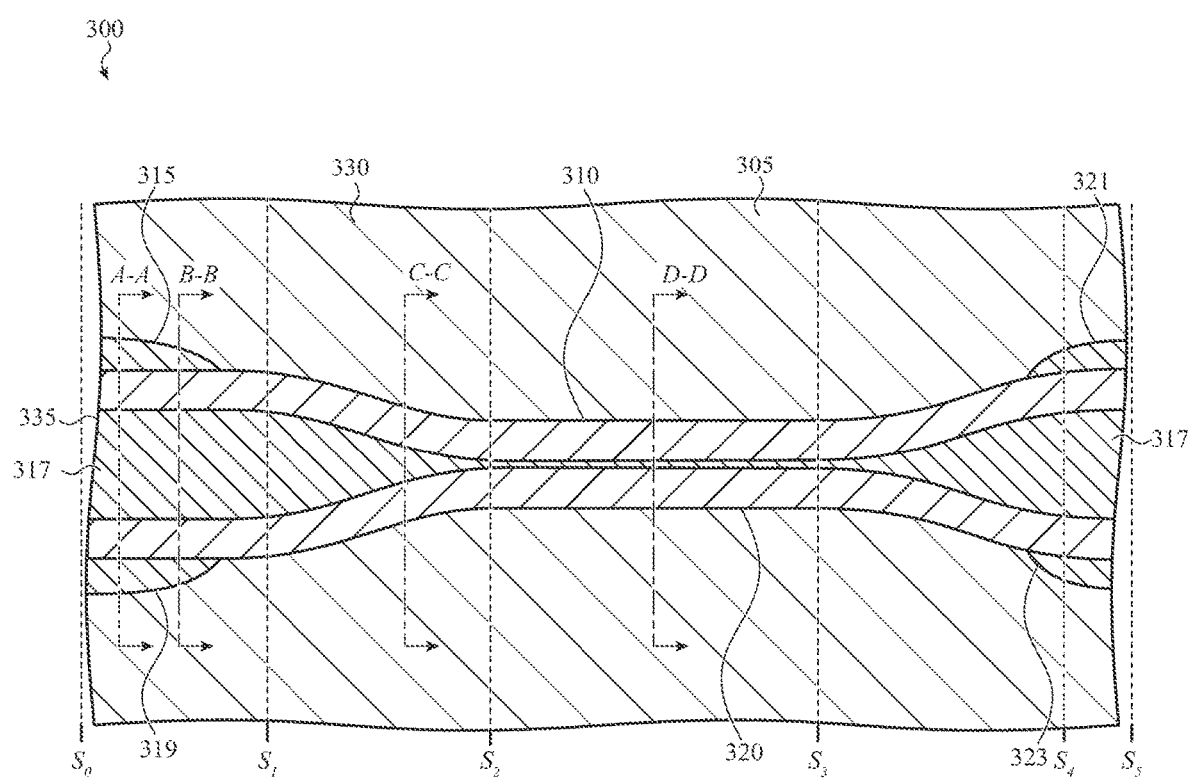
FIG. 3A illustrates an example diagram of another optical coupler as described herein.
Figure 3B:
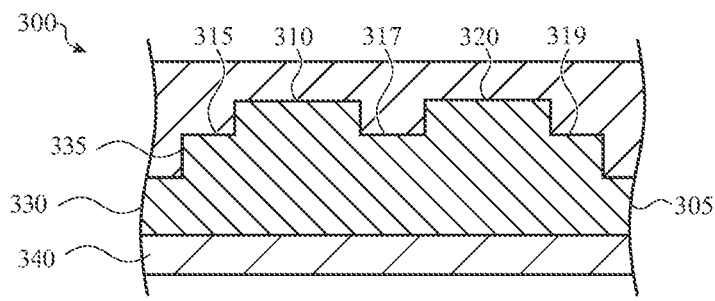
FIG. 3B illustrates an example diagram of the cross-section A-A of FIG. 3A.
Figure 3C:
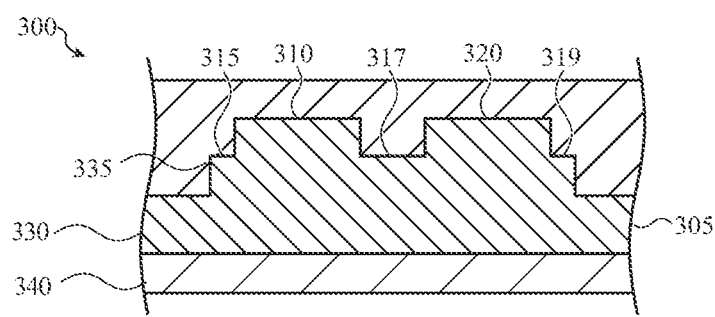
FIG. 3C illustrates an example diagram of the cross-section B-B of FIG. 3A.
Figure 3D:
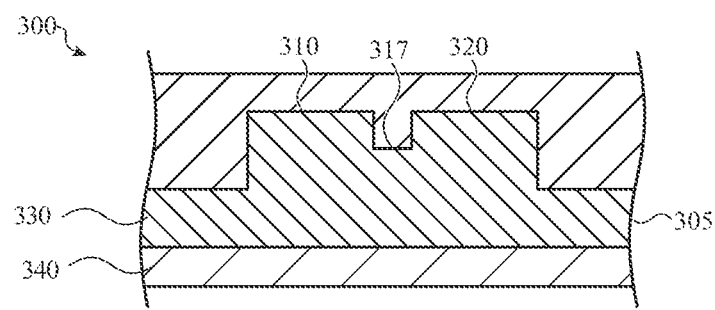
FIG. 3D illustrates an example diagram of the cross-section C-C of FIG. 3A.
Figure 3E:
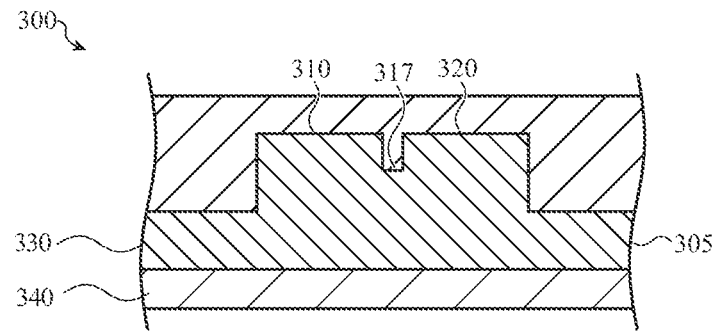
FIG. 3E illustrates an example diagram of the cross-section D-D of FIG. 3A.

In some variations, the widths of the first strip 310 and the second strip 320 also remain constant across some or all of the input region (between lines S0 and S1), the first transition region (between lines S1 and S2), the second transition region (between lines S3 and S4), and the output region (between lines S4 and S5). This is illustrated in FIGS. 3B-3E, which respectively show side views of the cross-sections A-A, B-B, C-C, and D-D of FIG. 3A. While the first shoulder region 315 and the third shoulder region 319 are shown in FIG. 3A as terminating in the optical coupler 300 as described with respect to the optical coupler 100 of FIGS. 1A-1E, it should be appreciated that in other variations the first shoulder region 315 and/or the third shoulder region 319 are instead configured to taper to a non-zero minimum width as described with respect to the optical coupler 200 of FIGS. 2A-2E.

As mentioned above, in some variations a rib waveguide of the optical couplers described here may include a shoulder having zero height. FIGS. 4A-4E show a variation of an optical coupler 400. As with the optical coupler 100 of FIGS. 1A-1E, the optical coupler 400 includes a slab waveguide 405 (hereinafter referred to as "slab 405"), a first strip 410 positioned on the slab 405, and a second strip 420 positioned on the slab 405. The first strip 410 and slab 405 form a first rib waveguide, with the slab 405 defining first and second shoulders of the first rib waveguide. Similarly, the second strip 420 and the slab 405 form a second rib waveguide, with the slab 405 defining first and second shoulders of the second rib waveguide.

The optical coupler 400 includes an input region (between lines S0 and S1), a first transition region (between lines S1 and S2), a central region (between lines S2 and S3), a second transition region (between lines S3 and S4), and an output region (between lines S4 and S5). These regions operate similarly to the same regions of optical coupler 100, such that the first and second rib waveguides are not optically coupled in the input and output regions, but are optically coupled in the central region. The optical coupler 400 is configured as an evanescent coupler in FIG. 4A (with the first and second strips 410, 420 maintaining constant widths across the central region), but can be configured in any manner as described above with respect to FIGS. 1A-3E.

The slab 405 is positioned on a cladding layer 440, and is shown in FIGS. 4A-4E as having a single region with a first height. The slab 405 defines the first and second shoulders for each of the first and second waveguides across the optical coupler 400. In some regions, the slab 405 defines the shoulders for the first and second rib waveguides, while in other regions the cladding layer 440 defines a shoulder of at least one rib waveguide. For example, the optical coupler may include a first shoulder region 415, a second shoulder region 417, and a third shoulder region 419, each of which is formed from the slab 405 and accordingly has the first height. The first shoulder region 415 is adjacent a first side of the first strip 410 and defines a first shoulder for at least a portion of the first rib waveguide. Similarly, the third shoulder region 419 is adjacent a first side of the second strip 420 and defines a first shoulder for at least a portion of the second rib waveguide. The second shoulder region 417 is positioned between the first and second strips 410, 420 and adjacent to both a second side of the first strip 410 and a second side of the second strip 420. Accordingly, the second shoulder region 417 defines both a second shoulder for at least a portion of the first rib waveguide and a second shoulder for at least a portion of the second rib waveguide.

The first shoulder region 415 is positioned in at least the input region of the optical coupler 400, and a width of the first shoulder region 415 tapers to asymmetrically confine the mode of light traveling in the first rib waveguide. FIG. 4B shows a side view of the cross-section A-A of FIG. 4A, in which the first shoulder region 415 has a first width (i.e., defined by the transition from the slab 405 to the cladding layer 440). The first width may be sized such that the first shoulder region 415 does not actively constrain the mode of light in the first rib waveguide, such that variations in the first width do not change the spatial profile of the light traveling through the first rib waveguide.

Figure 4A:
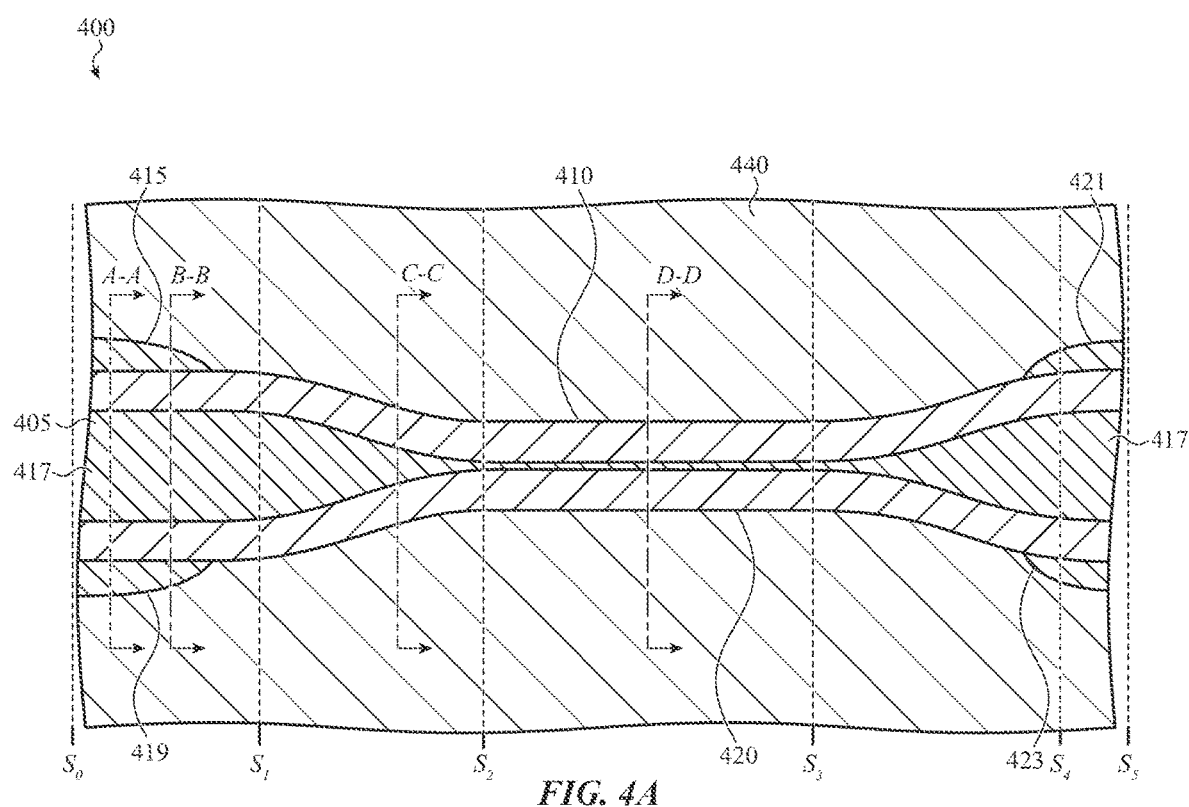
FIG. 4A illustrates an example diagram of another optical coupler as described herein.
Figure 4B:
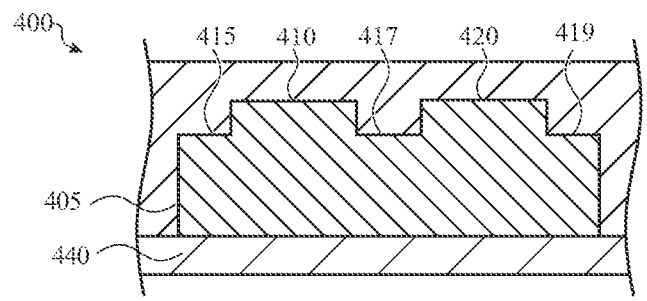
FIG. 4B illustrates an example diagram of the cross-section A-A of FIG. 4A.
Figure 4C:
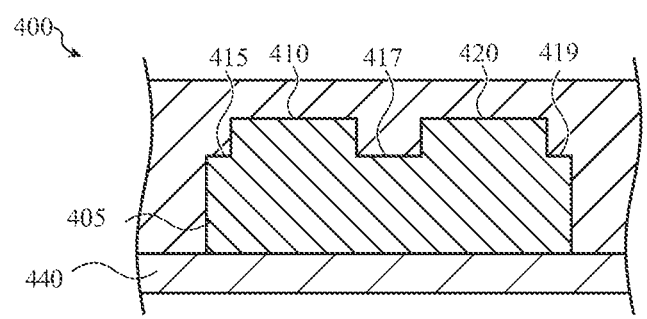
FIG. 4C illustrates an example diagram of the cross-section B-B of FIG. 4A.

Conversely, FIG. 4C shows a side view of the cross-section B-B of FIG. 4A, in which the first shoulder region 415 has a second width narrower than the first width. At this point, the second width of the first shoulder region 415 is sufficiently small such that it alters the spatial profile of the mode of light in the first rib waveguide. The second shoulder region 417 (which in the variation shown in FIG. 4A is positioned in each of the regions of the optical coupler), and thus the second shoulder of the first rib waveguide, has a width sized so that it does not actively constrain the mode of light in the first rib waveguide, thereby resulting in asymmetric confinement of the mode of light in the first rib waveguide.

Figure 4D:
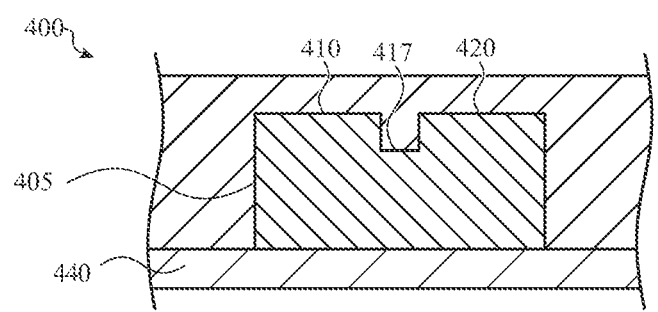
FIG. 4D illustrates an example diagram of the cross-section C-C of FIG. 4A.
Figure 4E:
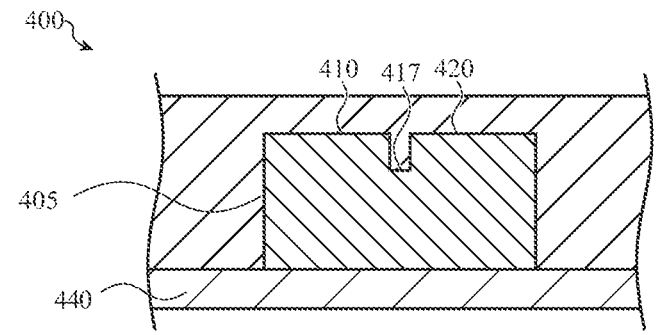
FIG. 4E illustrates an example diagram of the cross-section D-D of FIG. 4A.

The width of the first shoulder region 415 may taper to a zero minimum zero, such that the first shoulder region 415 terminates. After the first shoulder region 415 terminates, the cladding layer 440 is now adjacent to the first side of the first strip 410, and thereby defines the first shoulder (now with zero height) of the first rib waveguide in a different region of the first rib waveguide. This is illustrated in FIGS. 4D and 4E, which show side views of the cross-sections C-C in the first transition region and D-D in the central region, respectively, of FIG. 4A. In these regions, the first rib waveguide has two shoulders with different shoulder heights. Specifically, the first shoulder of the first rib waveguide is defined by a cladding layer, and thereby has zero height, while the second shoulder of the first rib waveguide is defined by the slab 405 (i.e., the second shoulder region 417), and thereby has the first height. This difference in shoulder height provides asymmetric mode confinement of light in the first rib waveguide, which may promote optical coupling to the second rib waveguide in the central region.

While the first shoulder region 415 is shown in FIG. 1A as tapering to its minimum width in the input region, it should be appreciated that the tapering may occur in any suitable portion of the optical coupler 400. In some instances, the first shoulder region 415 may begin tapering its width in the input region such that it begins asymmetrically confining light in the first rib waveguide in the input region, but does not reach its minimum width until the first transition region. In other variations, the first shoulder region 415 begins tapering in the first transition region (and thus does not asymmetrically confine light in the input region). In some of these variations, the first shoulder region 415 reaches its minimum width in the first transition region. In other variations, the first shoulder region 415 reaches its minimum width in the central region.

Similarly, the third shoulder region 419 is positioned in at least the input region of the optical coupler 100, and a width of the third shoulder region 419 tapers to asymmetrically confine the mode of light traveling in the second rib waveguide. For example, in the cross-section shown in FIG. 4B, the third shoulder region 419 has a first width defined by the transition from the slab 405 to the cladding layer 440. As with the first width of the first shoulder region 415 (which may be the same or a different width), the first width of the third shoulder region 419 may be sized such that the third shoulder region 419 does not actively constrain the mode of light in the second rib waveguide, such that variations in the first width do not change the spatial profile of the light traveling through the second rib waveguide.

Conversely, in the cross-section shown in FIG. 4C, the third shoulder region 419 has a second width narrower than the first width. As with the second width of the first shoulder region 415, the second width of the third shoulder region 419 is sufficiently small such that it alters the spatial profile of the mode of light in the second rib waveguide. The second shoulder region 417, and thus the second shoulder of the second rib waveguide, has a width sized so that it does not actively constrain the mode of light in the second rib waveguide, thereby resulting in asymmetric confinement of the mode of light in the second rib waveguide.

The width of the third shoulder region 419 may taper to a zero minimum width, such that the third shoulder region 419 terminates. After the third shoulder region 419 terminates, the cladding layer 440 is now adjacent to the first side of the second strip 420, and thereby defines the first shoulder of the second rib waveguide in a different region of the second rib waveguide. This is illustrated in the cross-sections shown in FIGS. 4D and 4E. In these regions, the second rib waveguide has two shoulders with different shoulder heights. Specifically, the first shoulder of the second rib waveguide is defined by the cladding layer 440, and thereby has zero height, while the second shoulder of the first rib waveguide is defined by the slab 405 (i.e., the second shoulder region 417), and thereby has the first height. This difference in shoulder height provides asymmetric mode confinement of light in the second rib waveguide, which may promote optical coupling to the first rib waveguide in the central region.

While the third shoulder region 419 is shown in FIG. 1A as tapering to its minimum width in the input region, it should be appreciated that the tapering may occur in any suitable portion of the optical coupler 400. In some instances, the third shoulder region 419 may begin tapering its width in the input region such that it begins asymmetrically confining light in the second rib waveguide in the input region, but does not reach its minimum width until the first transition region. In other variations, the third shoulder region 419 begins tapering in the first transition region (and thus does not asymmetrically confine light in the input region). In some of these variations, the third shoulder region 419 reaches its minimum width in the first transition region. In other variations, the third shoulder region 419 reaches its minimum width in the central region. It should be appreciated that the tapering of the first shoulder region 415 may occur in the same region or regions of the optical coupler 400 as the tapering of the third shoulder region 419, but need not.

In some instances, the optical coupler 400 further includes a fourth shoulder region 421. The fourth shoulder region 421, like the first shoulder region 415, is formed from the slab 405 and is positioned adjacent the first side of the first strip 410. The fourth shoulder region 421 is positioned in at least an output region of the optical coupler 400, and defines the first shoulder for a different portion of the first rib waveguide. While the width of first shoulder region 415 decreases along a direction from the input region toward the output region, the width of the fourth shoulder region 421 increases along this direction. Specifically, the fourth shoulder region 421 increases from a zero width to a width at which the fourth shoulder region 421 no longer actively constrains the mode of light. In this way, the fourth shoulder region 421 gradually eliminates the asymmetric mode confinement of light in the first rib waveguide. While the fourth shoulder region 421 is shown in FIG. 4A as tapering in the second transition region, it should be appreciated that the fourth shoulder region 421 may taper its width in any of the central region, the second transition region, the output region, or combinations thereof.

In these variations, the first rib waveguide has a first portion in which the first shoulder region 415 and the second shoulder region 417 respectively define the first and second shoulders of the first rib waveguide (which have the same height in this portion). The first rib waveguide has a second portion in which the cladding layer 440 and the second shoulder region 417 define the first and second shoulders of the first rib waveguide (which have different heights in this portion). The first rib waveguide has a third portion in which the fourth shoulder region 421 and the second shoulder region 417 respectively define the first and second shoulders of the first rib waveguide (which have the same height in this portion).

Similarly, the optical coupler 400 may further include a fifth shoulder region 423. The fifth shoulder region 423, like the third shoulder region 419, is formed from the slab 405 and is positioned adjacent the first side of the second strip 420. The fifth shoulder region 423 is positioned in at least an output region of the optical coupler 400, and defines the first shoulder for a different portion of the second rib waveguide. While the width of third shoulder region 419 decreases along a direction from the input region toward the output region, the width of the fifth shoulder region 423 increase along this direction. Specifically, the fifth shoulder region 423 increases from a zero width to a width at which the fifth shoulder region 423 no longer actively constrains the mode of light. In this way, the fifth shoulder region 423 gradually eliminates the asymmetric mode confinement of light in the second rib waveguide. While the fifth shoulder region 423 is shown in FIG. 4A as tapering in the second transition region, it should be appreciated that the fifth shoulder region 423 may taper its width in any of the central region, the second transition region, the output region, or combinations thereof.

In these variations, the second rib waveguide has a first portion in which the third shoulder region 419 and the second shoulder region 417 respectively define the first and second shoulders of the second rib waveguide (which have the same height in this portion). The second rib waveguide has a second portion in which the cladding layer 440 and the second shoulder region 417 define the first and second shoulders of the second rib waveguide (which have different heights in this portion). The second rib waveguide has a third portion in which the fifth shoulder region 423 and the second shoulder region 417 respectively define the first and second shoulders of the second rib waveguide (which have the same height in this portion).

The asymmetric mode confinement provided by the narrowed shoulder width in some portions of the first and second rib waveguides and the different shoulder heights in other portions of the first and second rib waveguides may allow the optical coupler 400 to obtain a target amount of light splitting in a smaller form factor as compared to traditional optical couplers as discussed above.

Figure 5:
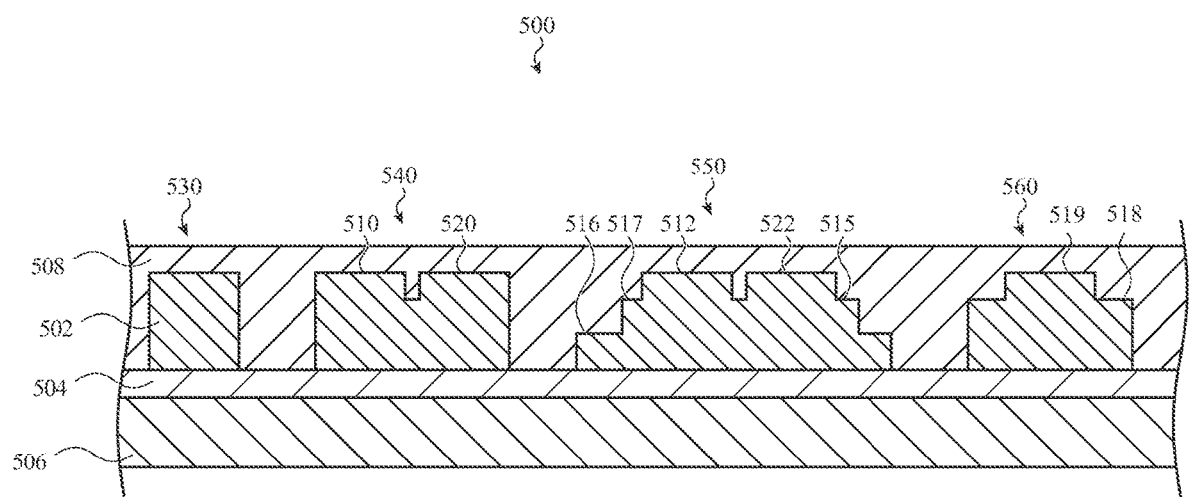
FIG. 5 illustrates an cross-sectional side view of a photonic integrated circuit that includes multiple different waveguide types.

It should be appreciated that the various shoulder heights of the optical couplers described herein may be formed by etching a layer of waveguide material. Specifically, a number of etch steps may be used to define the various waveguides described herein. For example, FIG. 5 illustrates a cross-section of an example photonic integrated circuit 500 illustrating multiple different types of waveguides. For example, a layer of waveguide material 502 (e.g., silicon, silicon nitride, or the like) may be formed on a cladding layer 504 (e.g., a dielectric such as silicon dioxide or the like), which in turn may be formed on a substrate 506 (e.g., silicon or the like). The waveguide material may be selectively etched to define one or more waveguides, and in some instances an additional cladding layer 508 may be deposited around the waveguides to provide optical confinement to the waveguides. While the cladding 508 is shown in FIG. 5 as a planarized layer, it should be appreciated that the cladding may have any suitable configuration, such as a coating that conforms to the contours of the waveguides of the photonic integrated circuit 500.

As shown in FIG. 5, a strip waveguide 530 may be formed by etching both sides of the strip waveguide 530 to the cladding layer 504 (although, in some instances, the etch may not completely etch through the layer of waveguide material 502). Also shown, there is a region of an optical coupler 540, such as described above with respect to FIGS. 4A-4E, which includes a first rib waveguide 510 and a second rib waveguide 520, each of which has a first shoulder having zero height and a second shoulder with a different height. To form this region, one etch step may define the zero height shoulders for each rib waveguide (which may be the same etch step that forms the strip waveguide 530), and a second etch step may define the second shoulder of each rib waveguide.

A third etch step may be used to define an optical coupler 550 having a slab waveguide 515 having a lower slab region 516 and an upper slab region 517. Specifically, the first etch step described above may define a boundary of the lower slab region 516, the second etch step described above may be used to define a first strip 512 and a second strip 522, and a third etch step (which may be performed between the first and second etch steps) may define a boundary of the upper slab region 517. Accordingly, the first strip 512 and second strip 522 may, along with the slab waveguide 515, form a first rib waveguide and a second rib waveguide respectively. Similarly, the first etch step described above may be used to define a slab waveguide 518 and the third etch step described above may define a strip 519 on the slab waveguide 518 to form a rib waveguide 560.

Figure 6:
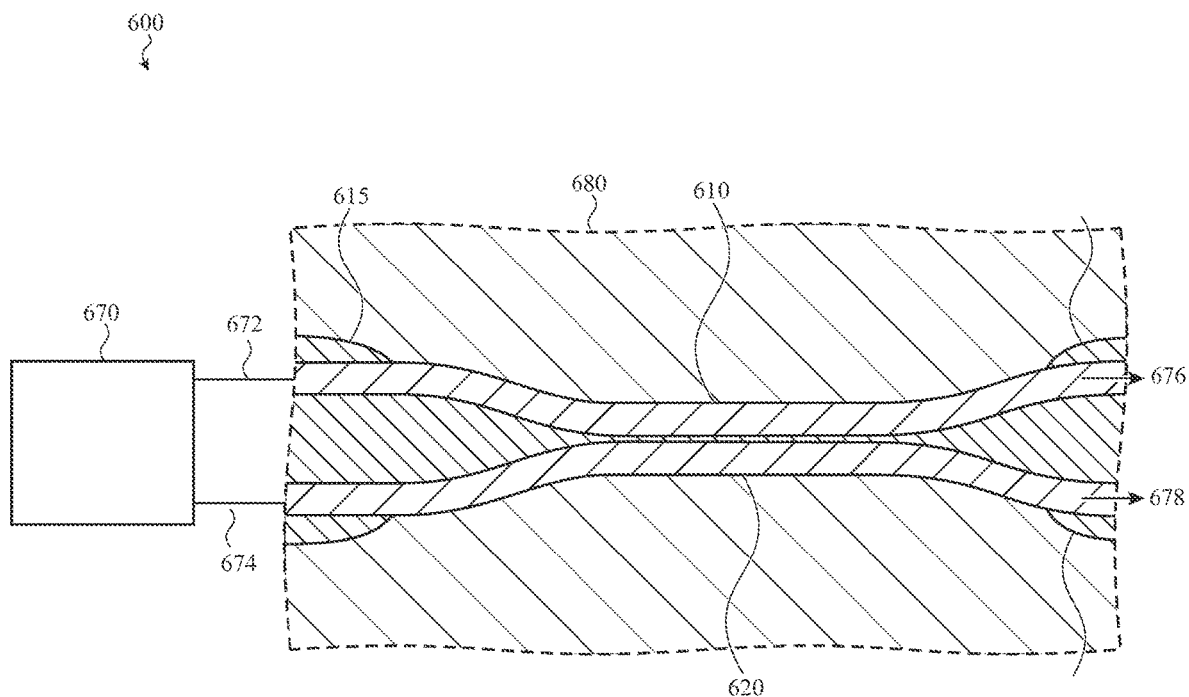
FIG. 6 illustrates a block diagram of an optical system that includes an optical coupler.

The optical couplers described herein may be incorporated in an optical system to split light received by one or more inputs of the optical coupler. For example, FIG. 6 illustrates an example of an optical system 600 that includes a light source unit 670 and the optical coupler 680. The optical coupler, which may be any of the optical couplers described previously, includes a first strip 610 and a second strip 620 positioned on a slab waveguide 615 to form a first rib waveguide and a second rib waveguide, respectively. The light source unit 670 includes one or more light sources (e.g., a laser, a light emitting diode, or the like), each of which are configured to emit light. A first portion of light from the one or more light sources may be introduced to the first rib waveguide via a first input waveguide 672. Additionally or alternatively, a second portion of light from the one or more light sources may be introduced to the second rib waveguide via a second input waveguide 674. In some instances, the light source unit 670 and the optical coupler 680 may be integrated into a photonic integrated circuit as discussed previously.

In some instances the first rib waveguide and the second rib waveguide may simultaneously receive light via the first and second input waveguides 672, 674 simultaneously. In some of these instances, the first portion of light received by the first rib waveguide is generated by a different set of light sources than the second portion of light received by the second rib waveguide. In others of these instances, the first portion of light and second portion of light are generated by the same light source or light sources, and the optical system 600 may further one or more components to split the light generated from the light source or sources into the first portion and the second portion. In other instances, the optical system 600 may be configured or otherwise operate such that only one rib waveguide receives light from the light source unit 670 at a time.

When a first portion of light is received by the first rib waveguide via the first input waveguide 672, the first portion of light will be split between the first rib waveguide and the second rib waveguide according to a predetermined splitting ratio. Accordingly, the optical coupler 680 will output a first output light 676 from the first rib waveguide and a second output light 678 from the second rib waveguide. Similarly, when a second portion of light is received by the second rib waveguide via the second input waveguide 674, the second portion of the light will be split between the first rib waveguide and the second rib waveguide according to the splitting ratio. As a result, the optical coupler 680 may be used to split and/or mix light received at one or both of its inputs, to provide output light that may be used downstream by the optical system 600.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An optical coupler, comprising:
a slab waveguide defining a first shoulder region, a second shoulder region, and a third shoulder region;
a first rib waveguide including a first strip positioned on the slab waveguide; and
a second rib waveguide including a second strip positioned on the slab waveguide, wherein:
the slab waveguide comprises a lower slab region having a first height and an upper slab region having a second height higher than the first height;
the upper slab region defines the first shoulder region, the second shoulder region, and the third shoulder region;
the first rib waveguide is optically coupled to the second rib waveguide in a central region;
the first shoulder region is adjacent to a first side of the first strip;
the third shoulder region is adjacent to a first side of the second strip;
the second shoulder region is adjacent to a second side of the first strip and a second side of the second strip; and
a width of the first shoulder region tapers to provide asymmetrical mode confinement of light that passes through the first rib waveguide.

2. The optical coupler of claim 1, wherein:
the width of the first shoulder region tapers to zero in a first portion of the first rib waveguide;
the first shoulder region defines a first shoulder of the first rib waveguide in the first portion of the first rib waveguide; and
the lower slab region defines the first shoulder of the first rib waveguide in a second portion of the first rib waveguide.

3. The optical coupler of claim 2, further comprising:
a fourth shoulder region, wherein:
the upper slab region defines the fourth shoulder region;
the fourth shoulder region defines the first shoulder of the first rib waveguide in a third portion of the first rib waveguide; and
a width of the fourth shoulder region tapers in the third portion of the first rib waveguide.

4. The optical coupler of claim 1, wherein:
a width of the third shoulder region tapers to provide asymmetrical mode confinement of light that passes through the second rib waveguide.

5. The optical coupler of claim 1, wherein:
a width of the first strip tapers in the central region.

6. The optical coupler of claim 1, wherein:
a width of the first strip is constant in the central region; and a width of the second strip is constant in the central region.

7. The optical coupler of claim 1, wherein:
the width of the first shoulder region tapers to a minimum width;
the first shoulder region defines a first shoulder of the first rib waveguide in the central region; and
the first shoulder region has the minimum width across the central region.

8. An optical coupler, comprising:
a first rib waveguide having a first strip, a first shoulder, and a second shoulder; and
a second rib waveguide having a second strip, a first shoulder, and a second shoulder; wherein:
   the first rib waveguide is optically coupled to the second rib waveguide in a central region;
   the first shoulder of the first rib waveguide has a first height in the central region;
   the second shoulder of the first rib waveguide has a second height higher than the first height in the central region;
   the first strip and the second strip are disposed on a slab waveguide, the slab waveguide having a lower slab region and an upper slab region;
   the slab waveguide defines the second shoulder of the first rib waveguide in the central region;
   the slab waveguide defines the second shoulder of the second rib waveguide in the central region
   the lower slab region defines the first shoulder of the first rib waveguide in the central region; and
   the upper slab region defines the second shoulder of the first rib waveguide in the central region.

9. The optical coupler of claim 8, wherein:
the first shoulder of the second rib waveguide has the first height in the central region; and
the second shoulder of the second rib waveguide has the second height in the central region.

10. An optical system, comprising:
one or more light sources configured to generate light; and
an optical coupler, comprising:
   a slab waveguide comprising a lower slab region having a first height and an upper slab region having a second height higher than the first height;
   a first rib waveguide optically coupled to the one or more light sources to receive a first portion of light therefrom; and
   a second rib waveguide optically coupled to the one or more light sources to receive a second portion of light therefrom, wherein:
   the first rib waveguide has a first strip and a first shoulder adjacent to a first side of the first strip;
   a width of the first shoulder of the first rib waveguide tapers in a first portion of the first rib waveguide to apply asymmetric mode confinement to the first portion of light;
   the second rib waveguide has a second strip and a first shoulder adjacent to a first side of the second strip;
   a width of the first shoulder of the second rib waveguide tapers in a first portion of the second rib waveguide to apply asymmetric mode confinement to the second portion of light;
   the upper slab region defines the first shoulder of the first rib waveguide in the first portion of the first rib waveguide; and
   the upper slab region defines the first shoulder of the second rib waveguide in the first portion of the second rib waveguide.

11. The optical system of claim 10, further comprising a photonic integrated circuit, wherein the photonic integrated circuit incorporates the one or more light sources and the optical coupler.

12. The optical system of claim 10, wherein:
the first rib waveguide is optically coupled to the second rib waveguide in a central region of the optical coupler.

13. The optical system of claim 12, wherein:
the first shoulder of the first rib waveguide has the first height in the first portion of the first rib waveguide and the first height in the central region.

14. The optical system of claim 13, wherein:
the first shoulder of the first rib waveguide tapers to a minimum width in the first portion of the first rib waveguide; and
the first shoulder has the minimum width in the central region.

\* \* \* \* \*